Dec. 6, 1966 O. EMELE 3,289,844
FILTER PRESS WITH MEANS FOR AUTOMATIC
DETACHMENT OF THE FILTER CAKES
Filed June 12, 1963 4 Sheets-Sheet 1

INVENTOR.
Otto Emele
BY Michael S. Striker
Attorney

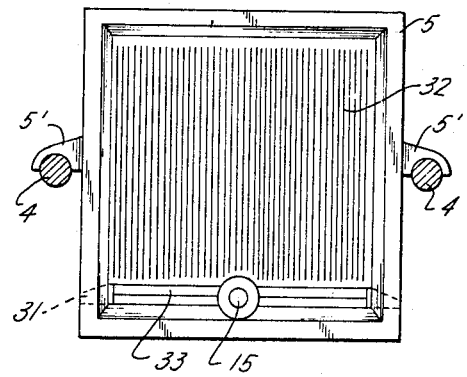
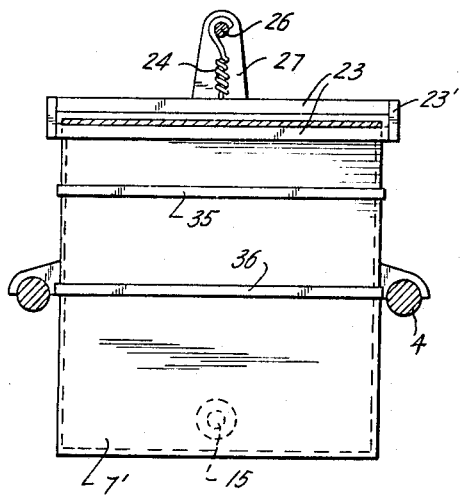
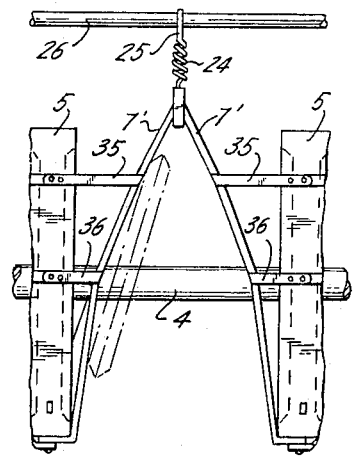

Dec. 6, 1966 O. EMELE 3,289,844
FILTER PRESS WITH MEANS FOR AUTOMATIC
DETACHMENT OF THE FILTER CAKES
Filed June 12, 1963 4 Sheets-Sheet 4

INVENTOR.
Otto Emele
BY
Michael S. Striker
Attorney

United States Patent Office 3,289,844
Patented Dec. 6, 1966

3,289,844
FILTER PRESS WITH MEANS FOR AUTOMATIC DETACHMENT OF THE FILTER CAKES
Otto Emele, Tettnangerstrasse 39, Kressbronn (Bodensee), Germany
Filed June 12, 1963, Ser. No. 287,306
Claims priority, application Germany, June 13, 1962, E 23,025
9 Claims. (Cl. 210—225)

The present invention relates to filter presses, and more specifically to a filter press with means for automatic detachment of the filter cake forming between the press plates of the press.

Filter presses are known which include a plurality of press plates mounted on an appropriate support movably with respect to each other between a closed and an open position and in which filter sheets are arranged between adjacent press plates to form filter cells therebetween so that when the medium to be filtered is fed into the filter cells, the filtrate will pass therethrough while the solid material will form a filter cake in each of the cells. Such filter cakes tend to cling to the filter sheets and the removal of the filter cakes from the filter sheets during opening of the press is usually rather time consuming and sometimes also connected with considerable difficulties.

It is one object of the present invention to overcome these difficulties inherent with filter presses of the type known in the art.

It is an additional object of the present invention to provide a filter press of the type described with means facilitating the detachment of the filter cakes during opening of the press.

It is a further object of the present invention to provide a filter press of the type described with means assuring automatic detachment of the filter cake from the filter sheets during opening of the press and in which the whole arrangement consists of relatively few and simple parts so that the press arrangement can be made at relatively low cost and will stand up trouble-free under extended use.

With these objects in view, the filter press according to the present invention mainly comprises support means carrying a plurality of press plates movable with respect to each other between a closed position in which adjacent press plates form between themselves filter chambers respectively defined by surfaces of adjacent plates facing each other, and an open position, and flexible filter sheet means having in each of the aforementioned chambers a pair of opposite filter sheet parts respectively engaging said surfaces and defining between themselves a filter cell and in which each of the filter sheet parts are connected along one edge portion thereof to one edge portion of the respective plate. The press according to the present invention further includes first passage means for feeding a medium to be filtered into said filter cells so that filter cakes will form between the filter sheet parts while the filtrate will pass therethrough, and second passage means for feeding the filtrate out of the chambers. Further provided are deflector means operatively connected to portions of the filter sheet parts spaced from the connected edge portions thereof for causing the opposite filter sheet parts of each filter cell to assume a position inclined to each other and to the surfaces of the respective plates when the plates are moved from the closed to the open position, to assure thereby the detachment of the filter cakes forming between each pair of opposite filter sheet parts when the plates are moved to the open position.

The deflector means preferably include a pair of elongated flexible means respectively connecting opposite filter sheet parts of each filter cell to each other at portions thereof distant from the edge portions which are connected to the respective edge portions of the plates, or which connect a portion of each filter sheet part distant from the aforementioned edge portion to a filter plate adjacent thereto. In these arrangements the filter sheet parts forming each filter cell will, during opening of the press, not only assume a position inclined to each other and inclined to the respective press plate adjacent thereto, but the portions of each filter sheet part to opposite sides of the respective flexible means will also include an angle with each other.

The filter sheet according to the present invention may be formed from an elongated web extending around one edge portion of each press plate and opposite parts of this web in each chamber formed between adjacent press plates are then integrally connected to each other along a fold line extending opposite the aforementioned edge portion of each plate. In such an arrangement the deflector means may comprise a plurality of resilient connecting means, preferably including an elongated member extending along and connected to the aforementioned fold line, a hook slidably mounted on an elongated guide means or guide rod extending in direction of movement of the press plates, and resilient means, for instance in form of a coil spring, extending between and connecting the hook with the elongated member. This arrangement may be used in combination with the above described elongated flexible means connecting opposite filter sheet parts forming each cell to each other, or connecting these filter sheet parts to press plates adjacent thereto.

The deflector means may also include weight means and in such arrangement each of the filter sheet parts forming the filter cells is connected along an upper edge thereof to press plate adjacent thereto, while the weight means are connected to the lower edges of the filter sheet parts. This last mentioned arrangement requires elongated flexible means as described before for assuring an inclined position of the filter sheet parts with respect to each other and the surfaces of the press plates adjacent thereto when the press plates are moved from the closed to the open position thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 7 shows a front view of a press plate used in the press according to the present invention;

FIG. 8 is a section taken along the line 8—8 of FIG. 9;

FIG. 9 is a partial side view of an additional modification;

Figure 1:
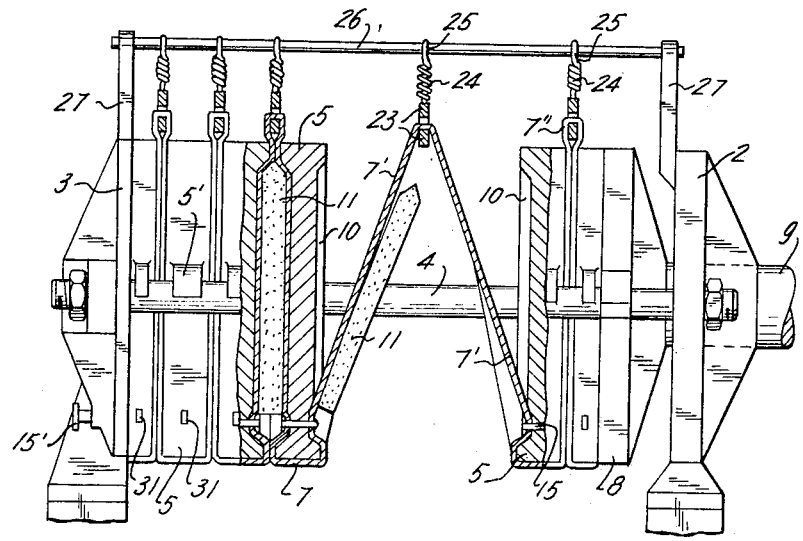
FIG. 1 is a schematic partly sectioned side view of a press arrangement according to the present invention.

Referring now to the drawings and more particularly to FIG. 1 of the same, it will be seen that the press according to the present invention comprises support means including a pair of end plates 2 and 3 extending substantially parallel and spaced from each other and connected to each other by connecting rods 4 which extend transversely spaced from each other through appropriate bores in the end plates and which are held thereon by nuts screwed onto opposite ends of the connecting rods. End plates 2 and 3 are provided with stiffening ribs on the sides thereof facing away from each other and these end plates are in turn supported at bottom portions thereof by appropriate supporting structures only partly shown in FIG. 1. A plurality of press plates 5 are arranged between the end plates 2 and 3 of the support means and each of the press plates 5 is provided with a pair of laterally projecting arms 5' by means of which the press plates are supported on the connecting rods 4 for sliding movement toward and away from each other. One of the press plates at the end of the series of press plates, and shown in FIG. 1 as the press plate at the right end of the series of press plates is engaged by a ram 8, which in turn is movable by a ram actuating member 9 slidably guided in an appropriate central bore of the right end plate 2, as viewed in FIG. 1, so that all of the press plates 5 may be moved by the ram 8 toward the left, as viewed in FIG. 1, to a closed position in engagement with each other in which adjacent press plates 5 form between themselves chambers 10. In FIG. 1 in which the ram 8 is shown in retracted position, adjacent to the end plate 2, the pair of press plates 5 in the middle of the series of press plates arranged on the rods 4, are shown in open position considerably spaced from each other. Actually, this spacing is shown for clarity sake greater than necessary and it is evident that in the position of the ram 8 as illustrated in FIG. 1 all of the press plates can be successively moved to an open position. It is also possible to make the spacing between the end plates 2 and 3 greater and the connecting rods 4 longer than shown in FIG. 1 and in this case all of the press plates 5 may be moved simultaneously to an open position when the ram 8 is moved to its retracted position as shown in FIG. 1. The member 9 may be moved in longitudinal direction by any means known in the art, but in a preferred form hydraulic piston and cylinder means are connected to the member 9 for moving the same in longitudinal direction so as to move the press plates to a closed position or to permit movement of the press plates to an open position.

The press according to the present invention includes further flexible filter sheet means which may be formed, as shown in FIG. 1, from an elongated web 7 having in each of the chambers 10 formed between adjacent press plates 5 a pair of opposite filter sheet parts 7' respectively engaging the surfaces of adjacent press plates 5 which form the chambers 10 therebetween so as to form between each pair of opposite filter sheet parts 7' a filter cell. The elongated filter sheet means or web 7 extends around a lower edge portion of each plate 5 and is connected thereto in any convenient manner and the opposite filter sheet parts 7' in each chamber 10 are integrally connected along a fold line to extend in form of a loop 7" between and beyond upper edge portions of adjacent press plates 5. First passage means 15 are provided, preferably in a lower portion of each press plate 5, for feeding a medium to be filtered into the filter cells 10. The passage means 15 are aligned with each other and with a corresponding passage formed in the end plate 3 and they respectively pass substantially fluid tightly connected through appropriate openings formed in the filter sheet parts 7' forming the respective filter cells between adjacent press plates 5. The surfaces of adjacent press plate 5, between which the chambers 10 are formed when the filter plates are moved to the closed position, are formed with vertically extending grooves and ridges 32 as schematically illustrated in FIG. 7, which communicate at the bottom ends thereof with a transverse groove 33, which in turn communicates at opposite ends thereof with openings 31 leading to the outer side faces of press plates 5 and constituting second passage means for feeding the filtrate passing through the filter sheet parts 7' out of the chambers 10, while the solid particles contained in the medium to be filtered will form filter cakes 11 between the filter sheet parts of each filter cell.

The arrangement according to the present invention includes further deflector means operatively connected to portions of the filter sheet part 7 spaced from the edge portions thereof which are connected to edge portions of the filter plate 5 for causing the opposite filter sheet parts 7' of each filter cell to assume positions inclined to each other and to the surfaces of the plates which form the filter chambers 10 therebetween when the plates 5 are moved from the closed to the open position to assure detachment of the filter cake 11 forming between each pair of oppositely filter sheet parts 7' when the plates 5 are moved to the open position thereof.

The deflector means shown in FIG. 1 include elongated guide means in the form of an elongated guide rod 26 located spaced from and above the press plates 5 and supported at opposite ends thereof by uprights 27 projecting respectively upwardly from the end plates 2 and 3 substantially in a vertical plane of symmetry, and a plurality of resilient connecting means mounted on the guide rod 26 for movement in longitudinal direction thereof and respectively attached to the loops or extended edge portions 7" of pairs of opposite filter sheet parts 7'. Each of the resilient connecting means may include a pair of elongated members 23 extending spaced from and substantially parallel to each other and connected to each other at the ends thereof by connecting pieces 23', a hook 25 slidably mounted on the guide rod 26, and resilient means, in form of a coiled tension spring 24, located between and connecting the hook 25 with the upper one of the elongated member 23. The loop portion 7" which integrally connects the upper edge portions of pairs of filter sheet parts 7' forming each filter cell extends through the space between the pairs of elongated members 23 and in this way the pair of filter sheet parts 7' of each filter cell are constantly kept in taut condition during movement of the corresponding press plate 5 between the open and closed positions.

As can be clearly seen from FIG. 1, the resilient connecting means 23–25 will keep the pair of opposite filter sheet parts 7' in taut condition when the press plates 5 cooperating with the respective filter sheet parts 7' are moved to the open position so that the filter sheet parts 7' will assume positions inclined to each other and inclined to the surfaces of the respective press plates 5 forming the filter chambers 10 thereof thereby assuring easy detachment of the filter cake 11 forming between the respective filter sheet parts 7'.

Figure 2:
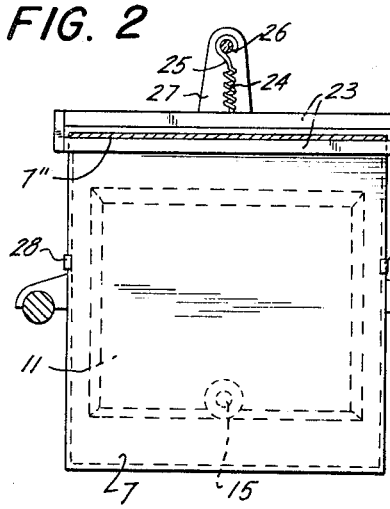
FIG. 2 is a section taken along the line 2—2 of FIG. 3.
Figure 3:
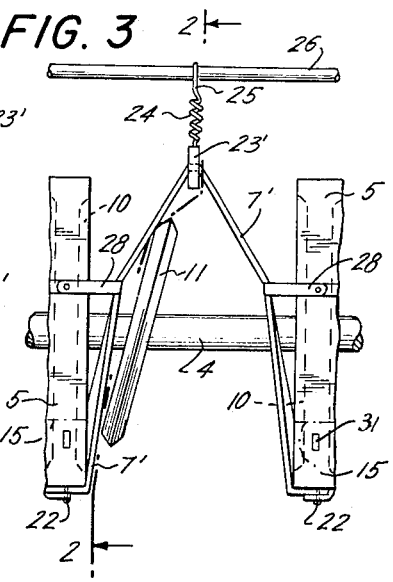
FIG. 3 is a partial side view of a modification of the press according to the present invention.

The deflector means may also include a plurality of elongated flexible means, in form of bands 28, respectively attached to the filter sheet parts 7' at portions thereof distant from the edge portion which is connected to the edge portion of the corresponding press plate 5. FIGS. 2 and 3 show an arrangement in which the bands 28 are respectively connected at one end thereof to vertical edge portions of filter sheet parts 7' at a location between the upper and lower edges thereof, while the other ends of the bands 28 are respectively connected to the press plates 5 adjacent the respective filter sheet parts 7'. The length of each band 28 is made such that when pairs of press plates 5 are moved to the open position, as shown for the two press plates illustrated in FIG. 3, the portions of each filter sheet part 7' respectively above and below the band 28 connected thereto will include an angle with each other which further assures easy detachment of the filter cake 11 from the respective filter sheet part 7'. In FIG. 3 the flexible filter sheet means 7 are not formed by an elongated web extending around and between all of the press plates 5, as shown in FIG. 1, but the filter sheet parts 7' of each filter cell are only integrally connected to each other along the upper edge portions thereof, while the lower edge portions are respectively fastened at 22 in any known manner to the lower edge portions of the respective press plate 5. Otherwise, the arrangement only partially shown in FIGS. 2 and 3 is the same as illustrated in FIG. 1 and described above.

Figure 4:
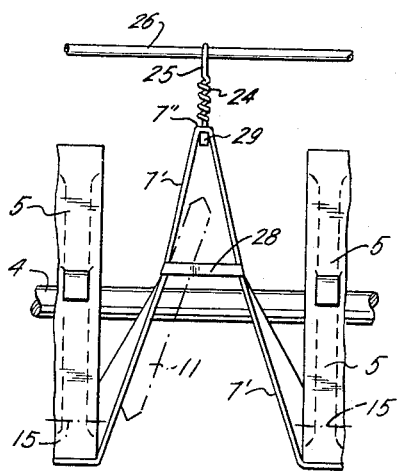
FIG. 4 is a partial side view similar to FIG. 3 and showing a further modification.

FIG. 4 shows a further modification, and in this modification a flexible band 28 connects each pair of filter sheet parts 7' forming the various filter cells to each other intermediate the upper and lower edge portions thereof. The arrangement shown in FIG. 4 will produce substantially the same result as that illustrated in FIG. 3 in that the portions of the filter sheet parts 7' respectively locate above and below the bands 28 will assume when the corresponding press plates 5 are moved to the open position, a position inclined to each other to further facilitate detachment of the filter cake 11 from the respective filter sheet part 7'.

The arrangement illustrated in FIG. 4 differs also from the above described arrangements in that only a single elongated member 29 is used instead of the pair of elongated members 23 for supporting the loop portion 7'' of each pair of filter sheet parts. The loop portion 7'' extends over the elongated member 29 and evidently in this case the loop portion has to be formed with a central hole through which a connection for the coil spring 24 extends which connects the member 29 with the corresponding hook 25.

Figure 5:
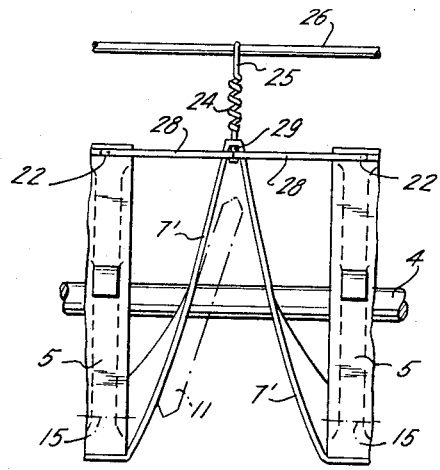
FIG. 5 is a partial side view similar to FIG. 4 and showing an additional modification.

FIG. 5 shows a further modification which is very similar to the modification illustrated in FIG. 3, and differing therefrom in that the bands 28 are attached to the respective filter sheet parts 7' adjacent the upper edge thereof. The bands 28 for each pair of filter sheet parts 7' have equal length and this will assure that the elongated member 29 of the resilient means 24, 25 and 29 will assume a position exactly midway between press plates 5 when the same are moved to the open position thereof. In this arrangement the bands 28 have each a length substantially equal to half of the distance adjacent press plates 5 will have when the same are moved to the open position as shown in FIG. 5.

FIGS. 8 and 9 show a further modification which is similar to that illustrated in FIGS. 2 and 3, but differs therefrom in that two bands 35 and 36 are provided for each of the filter sheet parts 7', which bands extend substantially parallel and spaced from each other and which have a different length, the lower bands 36 being shorter than the upper bands 35 so that the portion of each filter sheet part 7' located between the bands 35 and 36 will include an angle with the portions of the respective filter sheet part 7' located above the band 35 and below the band 36, respectively. The bands 35 and 36 may be formed as endless loops extending respectively around two filters sheet parts 7' located at opposite sides of each press plate 5.

Figure 6:
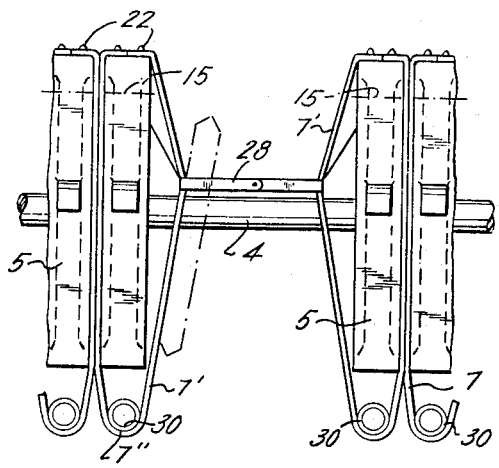
FIG. 6 is a partial side view showing a further modification.
Figure 10:
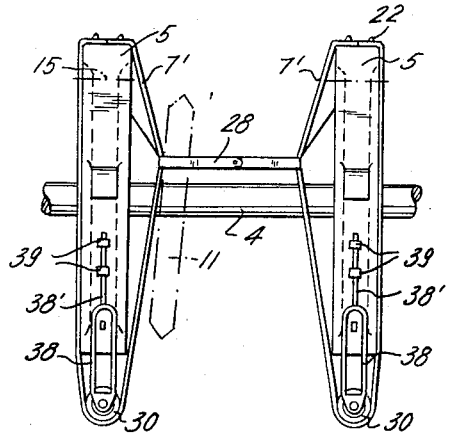
FIG. 10 is a partial side view showing a modification similar to FIG. 6.
Figure 11:
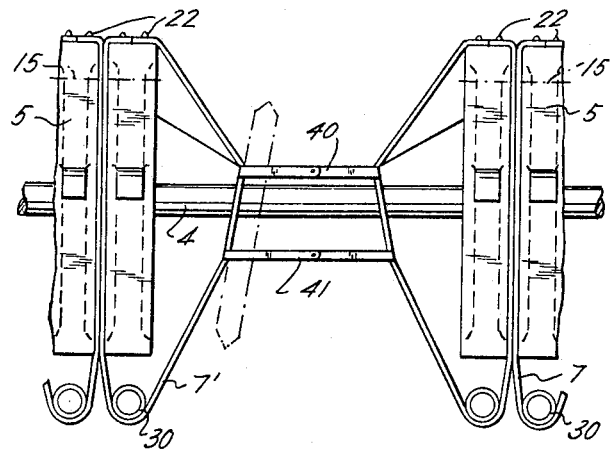
FIG. 11 is a partial side view similar to FIG. 10 and showing a slightly modified arrangement.

While in the modifications so far described the deflector means includes resilient connecting means 23, 24 and 25 or 29, 24 and 25 in which the hook 25 is slidably guided on the guide rod 26 for keeping the filter sheet parts 7' in taut condition when the corresponding press plates are moved to the open position thereof, the modifications shown in FIGS. 6, 10 and 11 use weight means 30 for keeping the filter sheet parts 7' in taut condition during opening of the press plate 5. In the arrangement shown in FIG. 6, the filter sheet parts 7' on opposite sides of each press plate 5 are integrally connected to each other at the lower edge portions thereof and extend in form of an extended loop 7'' below the corresponding lower edge portion of each plate 5. The upper edge portions of the filter sheet part 7' are respectively connected at 22 in any convenient manner to the upper edge portion of the corresponding press plate 5. Weight means, in form of tubes or rods 30, are located in the extended loop portions 7'' for keeping the filter sheet parts 7' in taut condition.

The arrangement illustrated in FIG. 6 includes also bands 28 connecting filter sheet parts 7' forming the respective filter cells to each other at portions thereof intermediate the lower and upper edge portions of the respective filter sheet parts 7'. Therefore, the portions of the filter sheet parts 7' respectively located above and below the bands 28 will assume an angle with each other, as shown in FIG. 6, when the press plates 5 are moved to the open position. While in the previously described modifications the first passage means 15 were located adjacent the lower edge portions of the press plates 5, the passage means 15 are arranged in the modification shown in FIG. 6 adjacent the upper edge portions of the press plates 5. The weight means 30 are slightly lifted during movement of the press plates to the open position and they move downwardly again when the press plates 5 are moved to the closed position thereof.

In a preferred arrangement the weight means 30 are guided in a vertical plane forming a plane of symmetry of the respective press plate 5 so that the weight means will always remain symmetrically arranged with respect to the corresponding press plate. Such an arrangement is shown in FIG. 10 in which guide members 38 are provided respectively connected to opposite ends of the weight means 30 and each having an upwardly extending rod 38' slidably guided in a pair of guide brackets 39 fixed to the respective press plate 5. Otherwise, the arrangement shown in FIG. 10 is identical to that shown in FIG. 6 and described above.

FIG. 11 shows a further modification which is very similar to the modification shown in FIG. 6 and which differs therefrom only in that two bands 40 and 41 are provided for each pair of filter sheet means 7' forming respectively the filter cells of the press. The bands 40 and 41 extend substantially parallel and spaced from each other and connect cooperating filter sheet parts 7' to each other intermediate the upper and lower edge portions. This arrangement shown in FIG. 11 will produce results substantially similar to the arrangement illustrated in FIG. 9, in that the portions of the filter sheet parts 7' located between the bands 40 and 41 will include an angle with the portions of the filter sheet parts 7' respectively located above the band 40 and below the band 41.

The deflector means in all modifications insure an easy detachment of the filter cake 11 from the flexible filter sheet means 7 so that the filter sheet means are subjected to less wear than in other filter presses known in the art. The filter sheets can be made from fabric woven from natural or artificial fibers or metal wires, and asbestos sheets as well as thin perforated metal sheets may be used as the filter sheet means. The bands 28, 35, 36, 40 and 41 may be made from woven material or from flexible metal strips, or the bands may also be made from elastic material, for instance rubber.

It will be understood that each of the elements described above, or two or more together, may also find a useful application in other types of filter presses differing from the types described above.

While the invention has been illustrated and described as embodied in a filter press with means for automatic detachment of the filter cake, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a filter press, in combination, support means; a plurality of rigid press plates mounted on said support means movable with respect to each other between a closed position in which adjacent plates form between themselves chambers respectively defined by surfaces of adjacent plates facing each other, and an open position; flexible filter sheet means having in each of said chambers a pair of opposite filter sheet parts respectively engaging said surfaces and defining between themselves a free space forming a filter cell, each of said filter sheet parts being connected along one edge portion thereof to one edge portion of the respective plate, each of said filter sheet parts having an extended edge portion opposite said one edge portion and extending beyond the respective press plate; first passage means for feeding a medium to be filtered into said filter cells so that filter cakes will form between said filter sheet parts while the filtrate will pass therethrough; second passage means for feeding the filtrate out of said chambers; elongated guide means carried by said support means and extending in direction of movement of said plates adjacent said extended edge portions of said filter sheet parts; a plurality of elongated flexible means respectively connecting filter sheet parts to each other at portions thereof distant from said one edge portion thereof; and a plurality of resilient connecting means mounted on said guide means for movement in longitudinal direction thereof and respectively attached to said extended edge portions of pairs of opposite filter sheet parts and each including an elongated member extending along and connected to said extended edge portions of pairs of opposite filter sheet parts, respectively, fastening means slidably mounted on said elongated guide means, and resilient means extending between and connecting said fastening means with said elongated member for disengaging each of said filter sheet parts with the exception of the connected edge portion thereof from said surface of the respective rigid press plate and for causing, in cooperation with said elongated flexible means, said opposite filter sheet parts of each filter cell to assume positions inclined to each other and to said surfaces of the respective plates when said plates are moved from said closed to said open position to assure detachment of the filter cake forming between each pair of opposite filter sheet parts when said plates are moved to said open position.

2. A filter press as set forth in claim 1, wherein said elongated flexible means are resilient.

3. A filter press as set forth in claim 1, wherein said press plates in the open position thereof are spaced in a predetermined distance from each other, and wherein said elongated flexible means have each a length shorter than said predetermined distance.

4. A filter press as set forth in claim 1, wherein said filter sheet means forms an elongated web extending about said one edge portion of each plate, and wherein said opposite filter sheet parts in each chamber are integrally connected to each other along a fold line extending opposite said one edge portion of each plate.

5. A filter press as set forth in claim 1, wherein said support means include a pair of stationary end plates arranged spaced from and substantially parallel to each other, and a pair of connection rods extending between said end plates and being fixed at opposite ends thereto, and wherein said elongated guide means comprises an elongated guide rod carried by said end plates and extending substantially parallel to and above said connecting rods adjacent to said extended edge portions of said filter sheet parts.

6. In a filter press, in combination, support means; a plurality of press plates mounted on said support means movable with respect to each other between a closed position in which adjacent plates form between themselves chambers respectively defined by surfaces of adjacent plates facing each other, and an open position; flexible filter sheet means having in each of said chambers a pair of opposite filter sheet parts respectively engaging said surfaces and defining between themselves a filter cell, each of said filter sheet parts being connected along an upper edge portion thereof to an upper edge portion of the respective plate; first passage means for feeding a medium to be filtered into said filter cells so that filter cakes will form between said filter sheet parts while the filtrate will pass therethrough; second passage means for feeding the filtrate out of said chambers; weight means attached to a lower edge portion of each filter sheet part; and flexible means extending between and being connected to portions of each pair of said filter sheet parts spaced from said edge portions thereof connected to said edge portions of said plates for causing said opposite filter sheet parts of each filter cell to assume positions inclined to each other and to said surfaces of the respective plates and to cause portions of each filter sheet part to opposite sides of said flexible means to assume angular positions with respect to each other when said plates are moved from said closed to said open position to assume detachment of the filter cake forming between each pair of opposite filter sheet parts when said plates are moved to said open position.

7. In a filter press, in combination, support means; a plurality of press plates mounted on said support means movable with respect to each other between a closed position in which adjacent plates form between themselves chambers respectively defined by surfaces of adjacent plates facing each other, and an open position spaced a predetermined distance from each other; flexible filter sheet means having in each of said chambers a pair of opposite filter sheet parts respectively engaging said surfaces and defining between themselves a filter cell, each of said filter sheet parts being connected along an upper edge portion thereof to an upper edge portion of the respective plate; first passage means for feeding a medium to be filtered into said filter cells so that filter cakes will form between said filter sheet parts while the filtrate will pass therethrough; second passage means for feeding the filtrate out of said chambers; weight means attached to a lower edge portion of each filter sheet part; elongated flexible means having a length shorter than said predetermined distance for each pair of opposite filter sheet parts and connected at opposite ends thereof to said pair of opposite filter sheet parts at portions between said edge portions thereof for causing said opposite filter sheet parts of each filter cell to assume positions inclined to each other and to said surfaces of the respective plates and to cause portions of each filter sheet part to opposite side of said flexible means to assume angular positions with respect to each other when said plates are moved from said closed to said open position to assure detachment of the filter cake forming between each pair of opposite filter sheet parts when said plates are moved to said open position.

8. In a filter press, in combination, support means; a plurality of press plates mounted on said support means movable with respect to each other between a closed position in which adjacent plates form between themselves chambers respectively defined by surfaces of adjacent plates facing each other, and an open position; flexible filter sheet means having in each of said chambers a pair of opposite filter sheet parts respectively engaging said surfaces and defining between themselves a filter cell, each of said filter sheet parts being connected along an upper edge portion thereof to an upper edge portion of the respective plate; first passage means for feeding a medium to be filtered into said filter cells so that filter cakes will form between said filter sheet parts while the filtrate will pass therethrough; second passage means for feeding the filtrate out of said chambers; weight means attached to a lower edge portion of each filter sheet part; flexible means extending between and being connected to portions of each part of said filter sheet parts spaced from said edge portions thereof connected to said edge portions of said plates for causing said opposite filter sheet parts of each filter cell to assume positions inclined to each other and to said surfaces of the respective plates and to cause portions of each filter sheet part to opposite sides of said flexible means to assume angular positions with respect to each other when said plates are moved from said closed to said open position to assure detachment of the filter cake forming between each pair of opposite filter sheet parts when said plates are moved to said open positions; and guide means for guiding said weight means for movement in a substantially vertical plane during movement of said press plates between said positions thereof.

9. In a filter press, in combination, support means; a plurality of rigid press plates mounted on said support means movable with respect to each other between a closed position in which adjacent plates form between themselves chambers respectively defined by surfaces of adjacent plates facing each other, and an open position spaced a predetermined distance from each other; flexible filter sheet means having in each of said chambers a pair of opposite filter sheet parts respectively engaging said surfaces and defining between themselves a free space forming a filter cell, each of said filter sheet parts being connected along one edge portion thereof to one edge portion of the respective plate, each of said filter sheet parts having an extended edge portion opposite said one edge portion and extending beyond the respective press plate; first passage means for feeding a medium to be filtered into said filter cells so that filter cakes will form between said filter sheet parts while the filtrate will pass therethrough; second passage means for feeding the filtrate out of said chambers; elongated guide means carried by said support means and extending in direction of movement of said plates adjacent said extended edge portions of said filter sheet parts; a plurality of elongated flexible means having each a length shorter than half of said predetermined distance and connecting each of said filter sheet parts at a portion thereof between said opposite edge portions thereof to a press plate adjacent thereto for pulling the portion of the filter sheet part connected thereto away from the surface of the respective plate and to cause portions of each filter sheet part to opposite sides of said flexible means to assume angular positions with respect to each other when said plates are moved from said closed to said open position; and means connected to each filter sheet part for maintaining the same in taut condition and comprising a plurality of resilient connecting means mounted on said guide means for movement in longitudinal direction thereof and respectively attached to said extended edge portions of pairs of opposite filter sheet parts and each including an elongated member extending along and connected to said extended edge portions of pairs of opposite filter sheet parts, respectively, fastening means slidably mounted on said elongated guide means, and resilient means extending between and connecting said fastening means with said elongated member.

References Cited by the Examiner

UNITED STATES PATENTS

| 2,849,121 | 8/1958 | Burwell | 210—226 |
| 2,932,399 | 4/1960 | Emele | 210—225 |

FOREIGN PATENTS

| 645,657 | 7/1962 | Canada. |
| 11,771 | 6/1899 | Great Britain. |

REUBEN FRIEDMAN, *Primary Examiner.*

SAMIH N. ZAHARNA, *Examiner.*

C. DITLOW, *Assistant Examiner.*